United States Patent [19]

Newman

[11] 4,087,579

[45] * May 2, 1978

[54] PRESSURE-SENSITIVE TRANSFER ELEMENTS

[75] Inventor: Douglas A. Newman, Glen Cove, N.Y.

[73] Assignee: Columbia Ribbon & Carbon Mfg. Co., Inc., Glen Cove, N.Y.

[ * ] Notice: The portion of the term of this patent subsequent to Feb. 3, 1993, has been disclaimed.

[21] Appl. No.: 649,718

[22] Filed: Jan. 16, 1976

[51] Int. Cl.[2] .............................................. B32B 7/02

[52] U.S. Cl. .................................. 428/216; 282/27.5; 427/146; 428/307; 428/336; 428/337; 428/474; 428/480; 428/910; 428/914

[58] Field of Search ............... 428/336, 306, 914, 307, 428/337, 474, 480, 216, 212, 910; 427/146; 264/346; 282/27.5

[56] References Cited

U.S. PATENT DOCUMENTS

| | | | |
|---|---|---|---|
| 3,037,879 | 6/1962 | Newman et al. | 428/306 |
| 3,061,886 | 11/1962 | Seager et al. | 264/346 |
| 3,442,681 | 5/1969 | Newman et al. | 428/914 X |
| 3,689,301 | 9/1972 | Scott | 428/914 X |
| 3,753,828 | 8/1973 | Manne et al. | 428/474 |
| 3,930,099 | 12/1975 | Gregson | 427/146 X |
| 3,936,559 | 2/1976 | Newman | 428/212 |
| 3,962,513 | 6/1976 | Eames | 428/480 |
| 3,969,176 | 7/1976 | Bassett et al. | 428/480 |
| 4,016,321 | 4/1977 | McIntyre | 428/216 |

*Primary Examiner*—Thomas J. Herbert, Jr.
*Attorney, Agent, or Firm*—Thomas L. Tully

[57] ABSTRACT

Pressure-sensitive transfer sheets and ribbons having a flexible plastic foundation carrying a colored layer comprising pressure-transferable imaging material, the plastic foundation consisting of a laminate of tensilized, asymmetrically-oriented polyethylene terephthalate polyester film having a high tensile strength and a low % elongation and nylon film which has a substantially lower tensile strength and a substantially higher % elongation than said tensilized film.

7 Claims, No Drawings

PRESSURE-SENSITIVE TRANSFER ELEMENTS

Reference is made to earlier copending application, Ser. No. 337,926, filed Mar. 5, 1976, now U.S. Pat. No. 3,936,559.

It is recognized in the carbon paper and typewriter ribbon field that plastic film foundations offer many advantages over paper foundations for a variety of end usages. In cases where a complete release of the transferable layer is desired, as with executive-type single-use ribbons for quality copy, plastic foundations are used because they permit the complete release of the frangible transfer layer. U.S. Pat. No. 3,061,886 is illustrative of such ribbons. Also, in cases where reusability is most important and complete release is not desirable, plastic foundations are used in that they do not absorb oil from the so-called squeeze-out type resinous ink layer and thus result in carbon papers and ribbons which do not dry out or lose their imaging strength on aging. U.S. Pat. No. 3,037,879 is illustrative of such transfer elements.

The most important difficulty encountered in the prior art is the requirement for the co-existence of contradictory properties in the film foundation. The most popular film is symmetrically-oriented, non-tensilized polyethylene terephthalate polyester, commercially available under the trademark Mylar A. This material, in a one mil thickness, has a tensile strength of about 25,000 psi and is exceptionally strong and tear-resistant. Such Mylar A is not very deformable about the type face under the effects of typing pressure, having a % elongation (MD) of about 120, and it becomes embossed during typing, remains embossed and is difficult to rewind on a spool of limited capacity, in the case of ribbons. Other films such as polyethylene, polypropylene, and nylon have substantially higher % elongations than Mylar A and emboss to a greater degree than Mylar A. Also these films have the added disadvantage that they have substantially lower tensile strengths than Mylar A and tear or break more readily than Mylar A during handling and use.

It is also known to employ another type of polyethylene terephthalate film having reduced tendency to become embossed during typing as a foundation for pressure-sensitive transfer elements. Such film, available under the registered trademark Mylar T, has a reduced % elongation (MD) equal to about 40 for a film of 1 mil thickness and has exceptionally high resistance to embossment. Mylar T also has a high tensile strength (MD) of about 45,000 psi. However Mylar T is so strong and resistant to elongation and distortion about the type face that it is brittle and shatters or cracks frequently under the effects of typing pressure, causing breakage in the case of typewriter ribbons.

Another important disadvantage of certain prior art film ribbons is their tendency to stretch or elongate under the tension imposed during winding whereby the ribbons become wound too tightly on the ribbon spool. This frequently causes the surface of the ink layer to adhere to the uncoated rear surface of the film foundation of the adjacent convolution and/or to exude ink thereagainst. Thus when the ribbon is unwound portions of the ink pick over or transfer to the rear surface of the foundation and are lost for transfer purposes.

This same problem occurs in many cases due to the lack of dimensional stability of the film foundation with changes in temperature. Thus the ribbon is wound on a spool under ambient conditions approximating ordinary room temperature. When the wound ribbon encounters abnormal temperature variations, such as may occur under certain conditions of storage or shipping, the film foundation may expand or contract causing abnormal pressures to be exerted between the ribbon plies. This can cause the ink layer to adhere to and/or exude ink against the uncoated side of the film foundation in the same manner as discussed above in connection with tension, and/or can cause the wound ribbon to tighten, loosen or wrinkle. Such dimensional changes may make the wound ribbon difficult to handle and may adversely affect the imaging qualities of the ribbon.

The present invention is concerned with providing transfer sheets and ribbons with plastic film foundations which are exceptionally strong and break-resistant and which have the required deformability about the type face under the effects of typing pressure while being resistant to retained embossing.

The present invention is also concerned with providing such sheets and ribbons which are more dimensionally stable with changes in tension and temperature and under repeated typing action while maintaining good imaging properties.

The objects and advantages of the present invention are accomplished by the discovery that an ideal film foundation having exceptional strength, deformability, resistance to embossing and dimensional stability may be produced by laminating together two thin films, one of which is a tensilized, asymmetrically-oriented polyethylene terephthalate having a high tensile strength and low % elongation and is normally comparatively brittle but resistant to retained embossing and the other of which is nylon having lower tensile strength and higher % elongation and greater tendency to retained embossment. The combination results in a film composite having the unique properties of each of the components. While it would be expected that the weaker film having good deformability and high % elongation would be strengthened by lamination to the stronger, less-deformable polyester film, it is unexpected that the laminate is stronger, less brittle and more resistant to shattering, cracking, fracturing and breaking than the polyester film, per se, and that the laminate would be more deformable than a polyester film of equal caliper, and more resistant to retained embossing than the weaker film, per se. Also, the bi-film laminate has greater dimensional stability under the effects of changes in tension and temperature than the weaker film, per se. This appears to be the result of the two films having different expansion coefficients so that one remains stable when the other tends to be affected by heat or tension, and the stable film restrains the other film from changing dimensions.

The bi-film foundations of the present invention consist of a lamination of two individual films, each having a maximum caliper of about 1 mil. Preferably one film is thinner than the other and has a maximum caliper of about 0.5 mil. The lower end of the thickness range for each film is governed in most cases by commercial availability and appears to be about 0.2 mil.

The strong film, such as available from du Pont under the registered trademark Mylar T, has an ultimate tensile strength (MD) of about 45,000 psi in a 1 mil thickness and of about 32,000 psi (MD) in a 0.92 mil thickness, and has a % elongation (MD) of about 40 for 1 mil and 37 for 0.92 mil thicknesses. However other similar tensilized asymmetrically-oriented polyethylene terephthalate films having tensile strengths (MD) above about 31,000 and % elongations (MD) below about 60 (based upon 1 mil thicknesses) are also suitable.

The preferred weaker film is nylon, available from du Pont of Canada under the registered trademark Dartek. This film has a tensile strength of about 12,400 psi and a % elongation of about 400. In all cases the so-called weaker film or second film will have a tensile strength (MD) below about 26,000 and a % elongation (MD) greater than about 100. The test method employed to determine the tensile strength and % elongation values is ASTM D-882-73 (Method A) and is based upon the testing of films of 1.0 mil thickness.

Tensilized polyethylene terephthalate polyester film, also commonly referred to as asymmetrically-oriented and set polyethylene terephthalate film, is produced by extruding an amorphous film of polyethylene terephthalate, cooling the film, stretching the film more in one direction than the other and finally heating the stretched film above its glass transition temperature to set the film while maintaining the film held to prevent shrinkage. More specifically the amorphous film is extruded at a temperature of about 275° to 310° C, cooled to about 60° to 80° C, heated to 80° to 90° C, and stretched in one direction, such as transverse direction, from 3.4 to 3.7 times its original width. Then the mononaxially-stretched film is heated to from 110° to 150° C and stretched to a greater extent in the other direction, such as machine direction or extrusion direction, i.e. from 4.3 to 5 times its original length. Next the biaxially-oriented film is heat-set at a temperature higher then the temperature of the second stretching step, i.e. from 160° to 230° C, while the film is maintained under tension such as in a tentering device to prevent shrinkage. Finally the heat-set film is cooled to room temperature while still retained under tension and then released.

Such asymmetrically-oriented and heat-set films have substantially improved resistance to elongation and retained embossing under the effects of typing pressure than similar conventional polyethylene terephthalate films which are symmetrically-oriented. By "retained embossing" is meant the property of the film whereby it distorts under impact pressure and does not return to relatively flat, smooth condition when the impact pressure is relaxed.

The films are laminated to each other in conventional manner, preferably using a thin adhesive coating between the films so that a permanent bond is formed therebetween. When using an adhesive coating, a heat-activatable adhesive which is non-tacky when cold may be applied to one of the films, so that the films can be easily superposed in registration prior to lamination. The films are pressed into intimate contact and subjected to heat to activate the adhesive and bond the films together. Canadian Patent Nos. 578,286 and 712,135 teach compositions and methods for adhesively bonding films to each other. In cases where the adhesive coating is applied from volatile solvent, care must be taken to prevent trapping solvent between the films, causing bubbles. The adhesive coating may also be applied in the absence of solvent as liquid resin-forming materials which react and solidify on curing, such as epoxy resin materials, liquid acrylic monomers and prepolymers, and the like.

Another advantage of the present film foundations is that they provide different surfaces having different adhesion properties with respect to the imaging layer. Similarly, the two films may have substantially different solubility properties so that the imaging layer may be solvent-bonded to one film using a solvent which does not attack the other film so that the strength of the foundation is not greatly impaired.

The following examples is given by way of illustration and should not be considered limitative.

EXAMPLE 1

A bi-film foundation is formed by laminating films of 0.92 mil tensilized polyethylene terephthalate polyester and 0.5 mil nylon by means of a 0.1 mil intermediate layer of a polyester resin adhesive to form a unitary film having a caliper of about 1.6 mil.

This film foundation is then coated on the polyester surface with a 0.2 mil thick layer of polyvinylidene chloride resin (Saran) bonding layer, applied by means of volatile solvent. After removal of the solvent the following ink composition is applied to the surface of the bonding layer and the solvents are evaporated to produce a solidified ink layer having a thickness of about 0.6 mil. Prior to evaporation, the ethyl acetate solvent softens the Saran surface to permit intimate bonding with the ink layer.

| Ingredients | Parts by Weight |
|---|---|
| Vinyl chloride-vinyl acetate copolymer (Vinylite VYHH) | 9.0 |
| Toned carbon black | 5.0 |
| Blue toner pigment | 1.5 |
| Fatty acid ester | 5.0 |
| Vegetable oil | 4.8 |
| Wetting agent | 1.2 |
| Toluol | 18.0 |
| Methyl ethyl ketone | 18.0 |
| Ethyl acetate | 7.0 |

The coated web is then wound into rolls and subsequently cut into sheets or ribbons to produce reusable squeeze-out type transfer elements which provide exceptionally clear, sharp duplicate images under the effects of imaging pressure.

Ribbons produced according to the Example 1 have much greater dimensional stability under changes in temperature and/or tension under repeated typing action than the so-called weaker film, per se, and greater resistance to shattering, cracking and/or breaking than the tensilized polyester film, per se. The ribbons are wound onto spools under different degrees of minor tension and subjected to changes in temperature and to repeated typing action and periodically checked. Any variation in the tightness or looseness of the ribbon on the spool or any increase in the bulk of the ribbon is within acceptable limits.

Carbon sheets produced according to the Example 1 have similar dimensional stability, resistance to shattering and cracking and resistance to retained embossing than carbon sheets having a film foundation consisting of any of the single films mentioned.

It should be understood that the values set forth hereinbefore are fairly specific values for specific films having a thickness of 1.0 mil, and that other similar films of nylon will have higher or lower values of tensile strength and % elongation (within the limits of the nature of the film) depending upon the method of manufacture, degree of orientation, purity and other factors recognized by those skilled in the art.

Variations and modifications may be made within the scope of the claims and portions of the improvements may be used without others.

I claim:

1. A pressure-sensitive transfer element comprising a composite plastic film foundation carrying a solidified layer comprising pressure-transferable imaging material which is transferable from said foundation to a copy sheet under the effects of typing pressure, said composite foundation comprising a laminate of two different extruded plastic films, each having a maximum caliper of about 1 mil, one said film being a tensilized, asymmetrically-oriented polyethylene terephthalate polyester film having a tensile strength (MD) greater than about 31,000 psi, a % elongation (MD) of less than about 60 and relatively low deformability and low embossment retention under the effects of typing pressure and the other of said films being nylon having a tensile strength (MD) below about 26,000 and a % elongation (MD) greater than about 100, said nylon film deforming to a greater degree about a type face under the effects of typing pressure and having a higher embossment retention than said polyester film, said films being bonded together by means of a thin adhesive intermediate layer to form a laminate having greater resistance to cracking, breaking and fracturing under the effects of typing pressure than the said polyester film and greater strength and resistance to retained embossing than the said nylon film.

2. A pressure-sensitive transfer element according to claim 1 in which the layer on the foundation is of the frangible pressure-transferable type for one-time use.

3. A pressure-sensitive transfer element according to claim 1 in which the layer on the foundation comprises a porous structure of synthetic thermoplastic resin containing within the pores thereof said imaging material.

4. A pressure-sensitive transfer element according to claim 1 in which said polyester film has a thickness of from about 0.5 mil and 1.0 mil.

5. A pressure-sensitive transfer element according to claim 1 in which said nylon film has a thickness of from about 0.25 mil and 0.75 mil.

6. A pressure-sensitive transfer element according to claim 1 in which a thin ink-bonding layer of synthetic resin is present on the surface of the laminate supporting said layer of imaging material.

7. A pressure-sensitive transfer element according to claim 6 in which the layer comprising imaging material is solvent-bonded to the laminate, having been applied thereto by means of a volatile solvent which is a solvent for the ink-bonding layer.

* * * * *